United States Patent Office 3,410,937
Patented Nov. 12, 1968

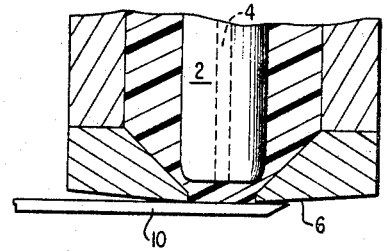
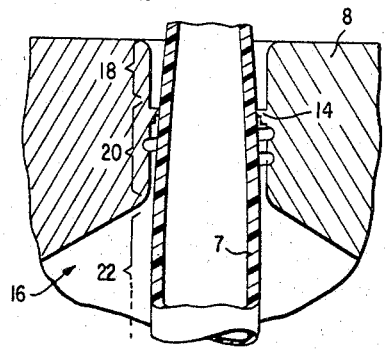
FIG.1
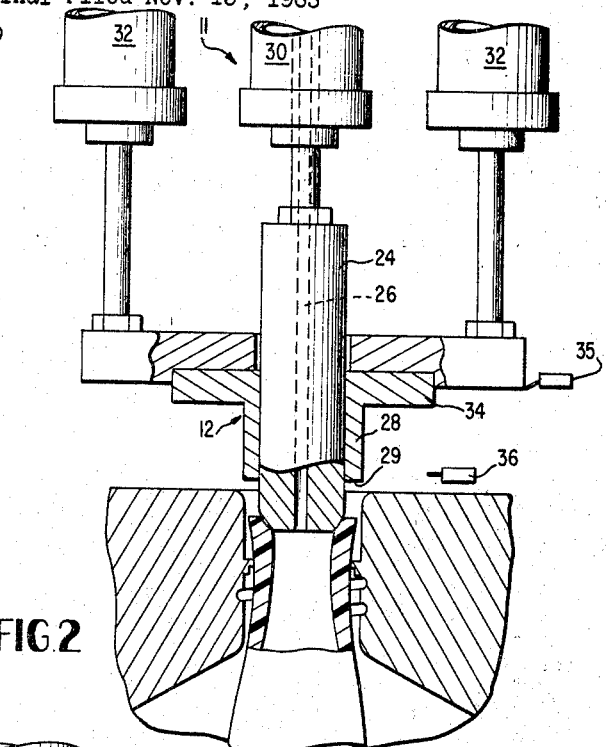
FIG.2
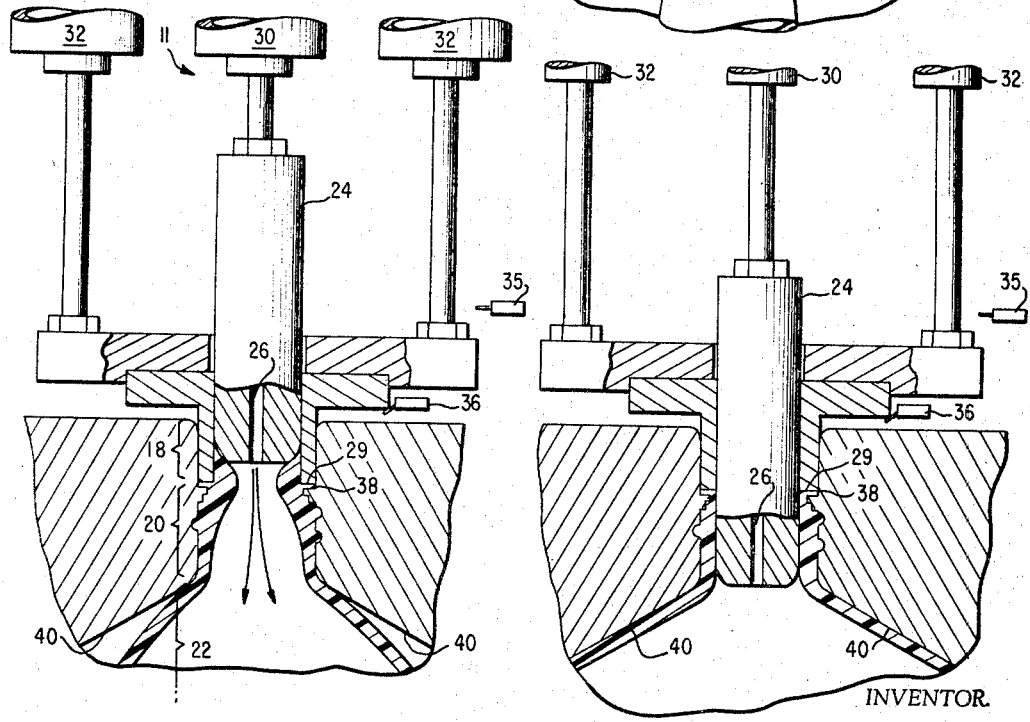
FIG.3   FIG.4
INVENTOR.
RAYMOND E. WINCHESTER, JR.
BY
Burns, Doane, Benedict, Swecker & Mathis
ATTORNEYS

3,410,937
MANUFACTURING THERMOPLASTIC ARTICLES
Raymond E. Winchester, Jr., Pawcatuck, Conn., assignor to Monsanto Company, a corporation of Delaware
Continuation of application Ser. No. 323,420, Nov. 13, 1963. This application May 18, 1967, Ser. No. 639,587
7 Claims. (Cl. 264—98)

ABSTRACT OF THE DISCLOSURE

A method of forming the neck of a hollow plastic article by controlled sequential advancement of a mandrel and coaxial collar into the trailing end of a parison supported on a protrusion in the neck cavity of a closed blow mold. A charge of pressurized gas may be injected into the parison prior to neck forming to partially expand the plastic into gripping engagement with the mold, thereby minimizing parison slippage during neck formation.

---

This application is a continuation of application Ser. No. 323,420, filed Nov. 13, 1963, now abandoned.

This invention relates to improvements in a process for manufacturing blown thermoplastic articles.

In the past, the plastic working industry has provided apparatus for forming blown plastic bottles and the like by longitudinally compressing a parison and thereby press molding the bottle neck portion prior to blow molding the base portion. Such apparatus usually includes a mandrel having an enlarged shoulder portion adapted to be introduced into a parison holding, multiple section mold having a recessed top portion or cavity adapted to receive the shoulder portion of the mandrel. The advantages of so forming a plastic bottle neck portion are significant in that a thicker neck portion may be provided, the upper extremity or face of the neck portion is press-molded in a finished form thereby eliminating the need for subsequent cutting and the like, and the internal diameter of the neck portion is finished formed in a smooth condition. However, in a high speed operation this method of forming blown plastic bottles is not without drawbacks. For example, it has been desirable to tightly close the multiple section mold on the parison in order to prohibit axial movement of the overall parison during the longitudinal compression and press molding of the upper portion thereof. Such a tight closure and subsequent longitudinal compression tended to form an undesired amount of flash on the bottle. Further, if axial slippage of the parison did occur, it was difficult to achieve uniform bottle wall thickness. This possibility has been particularly problematical when a rotary motion is also imparted to an axially progressing mandrel.

It is an object of the invention to provide a process for axially compressing and press molding a portion of a parison while controlling axial movement of an entire parison.

It is a further object of this invention to provide a process for press molding a plastic bottle or the like with a finished upper face and a smooth internal diameter but wherein flash is reduced and uniformity in wall thickness is increased.

It is still another object of this invention to provide a process whereby the upper face of a parison may be finished formed by longitudinal compression thereof by the remaining portion of the neck portion is press-molded by the generation of radial forces.

In achieving these and other objects which will appear hereinafter, this invention provides for extruding a parison from an extrusion nozzle, gripping a reduced area of the parison in a mold, injecting a small charge of air into said parison prior to severance from said extrusion nozzle, utilizing a composite mandrel for axially compressing a portion of said parison and for forming a lip thereon, and press-molding said portion by the generation of radial forces while blow-molding another portion of said parison.

A preferred embodiment of the present invention is illustrated in the accompanying drawing, in which:

FIGURE 1 is a schematic, vertical, sectional view representing this inventive apparatus at an early stage of the present inventive process;

FIGURE 2 is a schematic, vertical, sectional view on this invention in an intermediate stage after initial longitudinal compression of a parison.

FIGURE 3 is a schematic, vertical, sectional view of this invention in a subsequent phase after longitudinal compression of a parison is completed, and press-molding of one portion and blow molding of another portion of the parison is initiated; and FIGURE 4 is a schematic, vertical, sectional view of this invention at the completion of the press and blow molding cycle.

Referring in more detail to FIGURE 1 of the drawings, there is provided an extrusion head or nozzle 1 comprising an orifice tip 2 having a longitudinal air passage 4 and an orifice ring 6 through which plasticized material, for example, polyethylene, is extruded in a tubular form. The tubular material or parison 7 is received in a cavity of a multisection mold 8 and the mold closed thereon to close the lower end of the parison (not shown) in the usual manner. Prior to severance of the parison 7 from the nozzle 1 by a knife 10 or the like, and in order to stabilize the parison in the multisection mold 8, a small charge of air may be injected internally of the parison through the air passage 4 in the orifice tip 2. This air injection slightly enlarges the diameter of the parison so it may be more firmly gripped by the multiple section mold 8. However, if desired, this early air injection may be deleted and reliance placed on other gripping means which will be subsequently described. After the parison is gripped in the mold 8 and severed from the extrusion nozzle 1, the extrusion nozzle is removed from alignment with the mold and a blowhead assembly 11 is aligned therewith in the usual manner.

In order to firmly grip a reduced area of the parison 7, the mold 8 is provided with an annular rim 14 which aids in stabilizing the parison against longitudinal movement thereof during subsequent phases of operation. The parison receiving cavity 16 of the mold 8 includes an upper portion 18, an intermediate or neck-forming portion 20, and a lower portion 22, part of which is not shown. It will be seen that the rim 14 on the mold 8 projects inwardly adjacent the upper extremity of the intermediate cavity portion 20.

The blowhead assembly 11 includes a mandrel 12 which is a composite structure including a circular stem or plunger 24 having a longitudinal blow air passage 26 in the center thereof, and an independently movable circular collar 28. A hydraulic cylinder arrangement 30 or the like is provided to advance and retract the mandrel stem 24 independently of the mandrel collar 28. The mandrel collar 28 is likewise provided with a hydraulic cylinder arrangement 32 or the like secured to a plate 33 which is connected to a collar base 34 to independently advance or retract the collar 28 relative to the mandrel stem 24. The diameter of the collar 28 is substantially equal to the diameter of the upper portion 18 of the mold cavity 16 and the collar is adapted to be projected into said portion by the extension of the hydraulic means 32.

The process of operation of the present device is as follows: The parison 7 is extruded from the extrusion nozzzle 1 and the multiple section mold is closed on the parison so as to close the lower end of the parison and grip the upper end by contact of the rim 14 with the parison. A small charge of air may be injected into the parison through the passage 4 in the orifice tip 2 of extrusion nozzle 1 so as to slightly expand the parison to provide a better grip thereon. Subsequent to this initial air injection, the knife 10 is actuated so as to sever the parison 7 from the extrusion nozzle parent supply. The extrusion nozzle is removed from alignment with the mold 8 and a blowhead assembly 11 is aligned therewith. Both the mandrel stem 24 and collar 28 are advanced by their respective hydraulic arrangements 30, 32, so that the stem 24 acts to compress the upper end of the parison 7 into the upper portion 18 of the mold cavity 16. When the stem 24 assumes the position shown in FIGURE 2, approximately at the midpoint of the upper portion 18 of the cavity 16, a limit switch 35 or the like is actuated and further movement of the stem 24 is retarded while advance of the collar 28 is continued by its hydraulic arrangement 32. Such further independent movement of the collar 28 is continued until the lower face 29 of the collar 28 is moved to the lowest extremity of the upper portion 18 of the mold cavity 16, as shown in FIGURE 3, and limit switch 36 or the like is actuated. At this point, further advance of the collar 28 is ceased and the mandrel stem 24 is again advanced.

It will be understood that longitudinal compression of the upper portion of the parison is not such as to press-mold the same. Rather, the plasticized material is forced downwardly but inwardly of the upper cavity portion 18 as shown in FIGURE 3. However, the lower face 29 of the collar 28 compresses the upper face of the parison to finish form the same and thereby eliminate the necessity of subsequent cutting or finishing operations.

Upon the advance of the stem 24 from the position shown in FIGURE 2, air under pressure is injected internally of the parison through the bore 26. This blow air causes the lower end of the parison to expand into contact with the walls of the lower portion 22 of the cavity 16. Subsequent advance of the stem 24 from the position shown in FIGURE 3 to the position shown in FIGURE 4 operates to press mold the neck portion of the bottle in the intermediate portion 20 of the cavity 16 by the generation of substantially radial compressive forces.

It will be seen that longitudinal movement of the entire parison during the press molding longitudinal movement of the stem 24 is inhibited by the formation of a parison lip 38 which is formed by the prior independent longitudinal movement of the collar 28. Further, the injection of air, as suggested in FIGURE 3, prior to the press-molding longitudinal movement of the stem 24 in the intermediate cavity portion 20 operates to expand the lower periphery of the parison 7 into contact with the walls 40 of the lower cavity portion 22, which also acts to inhibit entire parison axial movement during the troublesome press-molding stage. Finally, since the compressive forces tending to press-mold the neck portion operate in a substantially radial direction, the tendency for axial slip of the entire parison is reduced.

After the stem 24 is moved to the position shown in FIGURE 4 and a cooling cycle is completed, the blow air is exhausted and the mold halves are opened. Subsequently, the blow head assembly 11, with the plastic article still impaled thereon, is raised in any convenient manner to a desired position at which point both the stem 24 and the collar 28 are retracted and the container is thereby rejected. As will be clear to one skilled in the art, conventional automatic means may be provided to perform the various steps of this inventive process in proper sequence.

It will be appreciated that, through the utilization of the present inventive method and apparatus, the upper face and the internal diameter of a bottle or the like may be press-molded in a finish form. Still further, longitudinal movement of the entire parison in the mold is minimized and uniform bottle wall thickness is induced by the provision of independently and cooperatively significant parison gripping means and the utilization of radially directed compressive press-molding forces.

Various other modifications and alterations will suggest themselves readily to persons skilled in the art. It is intended, therefore, that the foregoing be considered as exemplary only, and that the scope of the invention be ascertained from the following claims.

What is claimed is:

1. A method of forming a hollow article of plastic material having neck and body portions which comprises:
   (a) extruding tubular plastic material from an extrusion nozzle;
   (b) positioning the tubular plastic in a mold having neck and body forming cavities;
   (c) sealing a leading portion of the tubular plastic in the mold at a closed end of the body forming cavity;
   (d) peripherally gripping a trailing portion of the tubular plastic in a limited area of the neck forming cavity to indent and support the trailing portion in a single zone of said neck forming cavity;
   (e) axially advancing a collar into the supported trailing portion of the tubular plastic to a point rearwardly of the indentation in the peripherally gripped portion to form a lip in the tubular plastic;
   (f) axially advancing a mandrel movably enclosed within the collar, beyond the lip to substantially finish form the inside of the neck portion of the article; and
   (g) blow molding the remainder of the tubular plastic to form the body portion of the article.

2. The method of claim 1 wherein blow molding is initiated during finish forming of the article neck portion.

3. A method of forming a hollow article of plastic material having neck and body portions which comprises:
   (a) extruding tubular plastic material from an extrusion nozzle;
   (b) positioning the tubular plastic in a mold having neck and body forming cavities;
   (c) sealing a leading portion of the tubular plastic in the mold at a closed end of the body forming cavity;
   (d) peripherally gripping a trailing portion of the tubular plastic in a limited area of the neck forming cavity to indent and support the trailing portion in a single zone of said neck forming cavity;
   (e) axially advancing a mandrel into the interior of the trailing portion of the tubular plastic to a point where its foremost maximum diameter is rearwardly of the indentation in the peripherally gripped portion of the tubular plastic, to outwardly expand a portion of the tubular plastic behind said indentation in the peripherally gripped portion;
   (f) axially advancing a collar movably surrounding the mandrel, against the wall of the outwardly expanded portion of the tubular plastic to a point rearwardly of the indentation in the peripherally gripped portion, to form a lip in the trailing portion of the tubular plastic;
   (g) axially advancing the mandrel into the trailing portion of the tubular plastic beyond the lip to substantially finish form the inside portion of the neck; and
   (h) completing formation of the hollow article by blow molding.

4. A method of forming a hollow article of plastic material having neck and body portions which comprises:
   (a) extruding tubular plastic material from an extrusion nozzle;
   (b) positioning the tubular plastic in a mold having neck and body forming cavities;
   (c) sealing a leading portion of the tubular plastic in the mold at a closed end of the body forming cavity;
   (d) peripherally gripping a trailing portion of the tubular plastic in a limited area of the neck forming cavity to indent and support the trailing portion in a single zone of said neck forming cavity;

(e) injecting a charge of pressurized gas into said tubular plastic to partially expand said plastic into further gripping engagement with the mold;

(f) axially advancing a collar into the supported trailing portion of the tubular plastic to a point rearwardly of the indentation in the peripherally gripped portion to form a lip in the tubular plastic;

(g) axially advancing a mandrel movably enclosed within the collar, beyond the lip to substantially finish form the inside of the neck portion of the article; and (h) blow molding the portion of the tubular material in the body forming cavity to form the article body portion.

5. The method of claim 4 wherein the tubular material is severed from the extrusion nozzle subsequent to injection of the pressurized gas.

6. A method of forming a hollow article of plastic material having neck and body portions, which comprises:

(a) extruding tubular plastic material downwardly from the extrusion nozzle;

(b) positioning the tubular plastic in a mold having neck and body forming cavities;

(c) sealing the leading end of the tubular plastic in the mold at a closed end of the body forming cavity;

(d) peripherally gripping a trailing portion of the tubular plastic in a limited area of the neck forming cavity to indent and support the trailing portion of the tubular plastic in a single annular zone;

(e) axially advancing a mandrel into the interior of the trailing portion of the tubular plastic to a point within the neck forming cavity where its foremost maximum diameter is above the indentation in the peripherally gripped portion of the tubular plastic, to outwardly flare a portion of the tubular plastic above said indentation;

(f) axially advancing a collar movably surrounding the mandrel against the wall of the outwardly expanded portion of the tubular plastic to a point below the foremost maximum diameter of the mandrel, and above the peripherally gripped indented portion, to form a lip in the trailing portion of the tubular plastic;

(g) axially advancing the mandrel further into the trailing portion of the tubular plastic, beyond the lip in the trailing portion to substantially finish form the inside of the neck portion of the article; and (h) blow molding the remainder of the tubular plastic to form the body portion of the article.

7. The method of claim 6 wherein the tubular plastic is severed between the neck forming cavity and the extrusion nozzle prior to initial advancement of the mandrel.

References Cited

UNITED STATES PATENTS

| | | | |
|---|---|---|---|
| 3,008,191 | 11/1961 | Park | 264—98 |
| 3,012,286 | 12/1961 | Gasmire | 264—97 |
| 3,084,395 | 4/1963 | Thielfoldt | 264—98 |
| 3,164,646 | 1/1965 | Fischer | 264—98 |
| 3,009,196 | 11/1961 | Hagen | 264—99 |
| 3,224,038 | 12/1965 | Budesheim | 264—98 X |
| 3,271,489 | 9/1966 | Fogelberg et al. | 264—98 X |

ROBERT F. WHITE, *Primary Examiner.*

A. R. NOË, *Assistant Examiner.*